US008498792B2

(12) United States Patent
Abboud et al.

(10) Patent No.: US 8,498,792 B2
(45) Date of Patent: Jul. 30, 2013

(54) EFFICIENCY SCORE TRACKER FOR VEHICLE OPERATIONS

(75) Inventors: Eugenie Abboud, Novi, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 22 days.

(21) Appl. No.: 13/270,602

(22) Filed: Oct. 11, 2011

(65) Prior Publication Data

US 2013/0090821 A1 Apr. 11, 2013

(51) Int. Cl.
*G06F 19/00* (2006.01)

(52) U.S. Cl.
USPC .................. 701/70; 701/123; 701/1; 340/439

(58) Field of Classification Search
None
See application file for complete search history.

(56) References Cited

U.S. PATENT DOCUMENTS

2007/0239322 A1* 10/2007 McQuade et al. ................ 701/1
2010/0030582 A1* 2/2010 Rippel et al. ...................... 705/4
2010/0214089 A1* 8/2010 Giuli ............................ 340/459

* cited by examiner

*Primary Examiner* — Thomas Tarcza
*Assistant Examiner* — Garrett Evans
(74) *Attorney, Agent, or Firm* — Cantor Colburn LLP

(57) ABSTRACT

Implementing efficiency score tracking for vehicle operations includes identifying an operator of a vehicle. At each time increment of a driving event, the efficiency score tracking includes determining mileage accrual and energy consumed, calculating an efficiency value as a function of the mileage accrual and the amount of energy consumed, assigning a point value to the efficiency value, adding the point value to previous point values assigned during the driving event, and displaying a sum of the point value and the previous point values to the operator. The sum reflects a cumulative number of points assigned for a corresponding time increment and any previous time increments of the driving event. The efficiency score tracking also includes presenting a total point value reflecting a sum of all of the point values assigned to the operator of the vehicle for all of the time increments associated with the driving event.

20 Claims, 4 Drawing Sheets

EFFICIENCY SCORE TRACKER FOR VEHICLE OPERATIONS

FIELD OF THE INVENTION

The subject invention relates to eco-conservation, and more particularly, to a score tracker for rating the efficiency of vehicle operator activities.

BACKGROUND

Due to the impact of the carbon footprint created by the increased use and number of vehicles on the road today, as well as the rising costs of fuel, many individuals are looking for new ways to save money while protecting the environment. The rising popularity of electric and hybrid vehicles reflects the desire and intention of consumers to conserve energy and the environment.

Many households today own multiple vehicles due in part to the increasing affordability of ownership, as well as changing lifestyles in which both spouses work away from the home. In addition, over the last few decades, there has been an increase in the number of young adults and teenagers who own their own vehicles. While vehicle ownership and/or operation among multiple members of a household offer greater freedom and independence for these members, it also results in greater incidences of fuel consumption, environmental pollution, and related economic costs. In most cases, even if these individuals fully realize the financial costs involved in owning a vehicle, many of these individuals do not fully understand the negative effects their driving habits have on the environment. Pre-planning daily trips and modifying driving habits are some of the ways individuals can reduce these effects. However, these options are not easily established as consistent and routine behaviors as they are not always the most convenient options for these individuals.

What is needed, therefore, is a way to encourage efficient driving and vehicle operation techniques that are designed to maximize fuel economy, lower the overall maintenance costs over the life of a vehicle, encourage safe driving habits, and conserve the environment.

SUMMARY OF THE INVENTION

In one exemplary embodiment of the present invention a system for implementing efficiency score tracking for vehicle operations is provided. The system includes a computer processor and logic executable by the computer processor. The logic is configured to implement a method. The method includes identifying an operator of a vehicle. At each time increment for a duration of a driving event with respect to the vehicle, the method includes determining mileage accrual and an amount of energy consumed, calculating an efficiency value as a function of the mileage accrual and the amount of energy consumed, assigning a point value to the efficiency value, adding the point value to previous point values, if any, assigned during the driving event, and displaying a sum of the point value and the previous point values, if any, to the operator in the vehicle. The sum reflects a cumulative number of points assigned for a corresponding time increment and any previous time increments of the driving event. The method also includes presenting a total point value reflecting a sum of all of the point values assigned to the operator of the vehicle for all of the time increments associated with the driving event.

In another exemplary embodiment of the present invention, a method for implementing efficiency score tracking for vehicle operations is provided. The method includes identifying an operator of a vehicle. At each time increment for a duration of a driving event with respect to the vehicle, the method includes determining mileage accrual and an amount of energy consumed, calculating an efficiency value as a function of the mileage accrual and the amount of energy consumed, assigning a point value to the efficiency value, adding the point value to previous point values, if any, assigned during the driving event, and displaying a sum of the point value and the previous point values, if any, to the operator in the vehicle. The sum reflects a cumulative number of points assigned for a corresponding time increment and any previous time increments of the driving event. The method also includes presenting a total point value reflecting a sum of all of the point values assigned to the operator of the vehicle for all of the time increments associated with the driving event.

In yet another exemplary embodiment of the present invention a computer program product for implementing efficiency score tracking for vehicle operations is provided. The computer program product includes a storage medium embodied with computer-readable program instructions, which when executed by a computer, cause the computer to implement a method. The method includes identifying an operator of a vehicle. At each time increment for a duration of a driving event with respect to the vehicle, the method includes determining mileage accrual and an amount of energy consumed, calculating an efficiency value as a function of the mileage accrual and the amount of energy consumed, assigning a point value to the efficiency value, adding the point value to previous point values, if any, assigned during the driving event, and displaying a sum of the point value and the previous point values, if any, to the operator in the vehicle. The sum reflects a cumulative number of points assigned for a corresponding time increment and any previous time increments of the driving event. The method also includes presenting a total point value reflecting a sum of all of the point values assigned to the operator of the vehicle for all of the time increments associated with the driving event.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
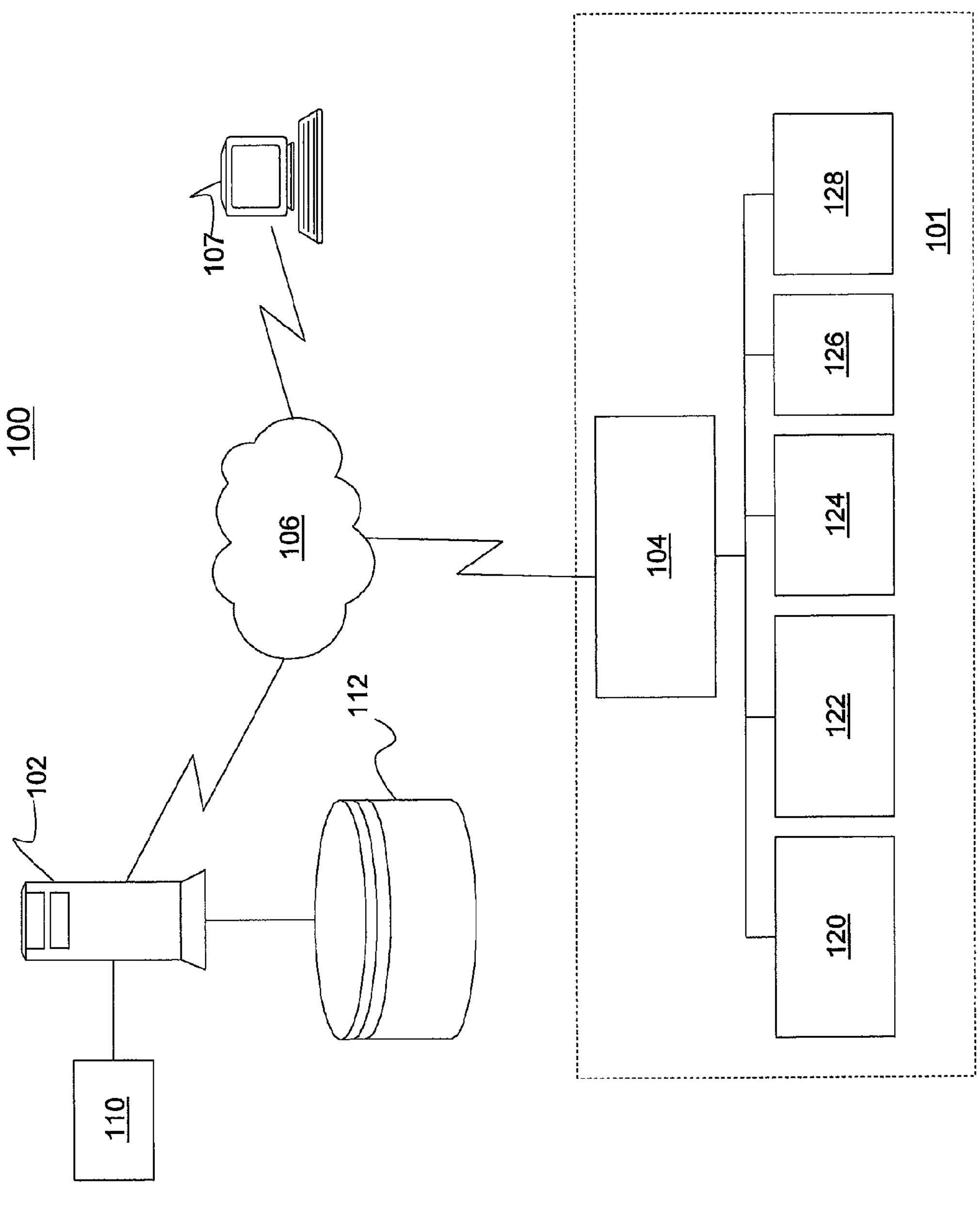
FIG. 1 is a block diagram of a system upon which efficiency score tracking services may be implemented in accordance with an embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, efficiency score tracking services are provided. The efficiency score tracking services provide a tool that encourages efficient driving and vehicle operation and maintenance techniques that are designed to maximize fuel economy, lower the overall maintenance costs over the life of a vehicle, encourage safe driving habits, and conserve the environment. The efficiency score tracking services provide the ability for vehicle operators to engage in a friendly competition that awards points for designated driving and maintenance/repair activities. The services create three scorecards: a driving efficiency scorecard, a vehicle maintenance and repair, and a recommended safety scorecard. The driving efficiency scorecard tracks driving habits of vehicle operators, calculates a driving efficiency point value reflecting an amount of energy saved for corresponding driving events, and provides this information to operators in a fun and competitive way that encourages and motivates operators to adopt healthy driving techniques. The vehicle maintenance scorecard tracks the execution of recommended or scheduled vehicle maintenance and repairs, calculates a vehicle maintenance point value reflecting a level of achievement in maintaining the scheduled vehicle servicing, and provides this information to operators in a similar manner as described above for the driving efficiency scorecard. The recommended safety scorecard tracks the execution of recommended safe driving activities, such as turn signal usage, speed limit compliance, tailgating prevention, and lane change clearance, etc., calculates a safety point value reflecting a level of achievement in maintaining consistent safe driving habits, and provides this information to operators in a similar manner as described above for the driving efficiency scorecard. The scorecard information may be presented on an existing display in the vehicles participating in the services. Incentives and awards may be provided to top achieving vehicle operators based on total points earned or other achievements, such as highest percentage of improvements of operators in their driving efficiencies. These and other features of the efficiency score tracker services will now be described.

Turning now to FIG. 1, a system 100 upon which efficiency score tracking services may be implemented will now be described in an exemplary embodiment. The system 100 includes a portion of a vehicle 101 including components used in facilitating the efficiency score tracker services. The vehicle 101 may be any type of automobile known in the art. As shown in FIG. 1, the system 100 also includes a host system 102 and a user system 107. The vehicle 101, the user system 107, and host system 102 are communicatively coupled to one another via one or more networks 106.

The host system 102 may be implemented as a high-speed computer processing device (e.g., a mainframe computer) capable of handling a high volume of activities conducted by the vehicle 101 and the user system 107 with regard to the host system 102. The host system 102 may be operated by an enterprise or organization implementing the exemplary efficiency score tracker services described herein. In one embodiment, the host system 102 is implemented by a road side service provider entity, such as OnStar™. The host system 102 may operate as a web server including a web site for generating accounts or subscriptions to the efficiency score tracker services. The host system 102 may also operate as an application server including one or more applications for providing the efficiency score tracker services described herein. These one or more applications are collectively referred to herein as efficiency score tracker logic 110. In an embodiment, the host system 102 is communicatively coupled to a storage device 112, which stores accounts established for subscribers of the efficiency score tracker services, as well as related data used to facilitate the efficiency score tracker services. Account records created via the efficiency score tracker logic 110 may include subscriber identification data (e.g., name, address, vehicle identification number, user identification, etc.) and user preferences selectable by the subscribers of the efficiency score tracker services. While the storage device 112 is shown in FIG. 1 as a separate physical device from the host system 102, it will be understood that the storage device 112 may be integrated into the host system 102 as internal storage (e.g., as a hard disk drive).

The user device 107 may be any type of communications device capable of sending and receiving information over a network. For example, the user device 107 may be a general desktop computer or laptop, or may be a wireless device, such as a smart phone or personal digital assistant. The user device 107 may be operated by a subscriber or prospective subscriber of the efficiency score tracker services. A subscriber of the efficiency score tracker services may access the host system 102 web site to establish or modify user preferences, as will be described herein.

The networks 106 may be any type of known networks in the art. For example, the networks 106 may be a combination of public (e.g., Internet), private (e.g., local area network, wide area network, virtual private network), and may include wireless and wireline transmission systems (e.g., satellite, cellular network, terrestrial networks, etc.).

The vehicle 101 includes a communication system 104, which in turn comprises input/output (I/O) components 120, a computer processor 122, logic 124, a global positioning system (GPS) 126, and a storage device 128, each of which may be in communication with one another via a communications bus (not shown). The input components of the I/O components 120 may include input controls (e.g., keypad) or may be implemented by voice recognition technology and voice commands. The output components of the I/O components 120 may include a display screen or monitor, or may be an audio system that presents audio messages or alerts to occupants of the vehicle 101. The computer processor 122 executes the logic 124, which in turn is configured to receive inputs via the I/O components 120 in assisting a user to establish operator settings and processes the inputs to create, modify, or view user preferences, as well as existing scorecards, as will be described further herein. The file may be stored in the storage device 128 and/or the storage device 112 via transmission over the networks 106 and may be accessed by the logic 124 and/or the efficiency scorecard logic 110 as needed.

The GPS 126 may be implemented by a navigation system. In an exemplary embodiment, the storage device 128 is in communication (e.g., via the communications bus) with the GPS 126 whereby the GPS 126 stores commonly used routes in the storage device 128. The communication system 104, e.g., via the logic 124, may be configured to use the stored routes in determining a geographic location of the vehicle 101, which may be used by the efficiency score tracker logic 110. For example, the efficiency score tracker logic 110 may identify a vehicle's general location via the GPS 126 navigation system and use the location information to determine a climate for the location. The efficiency score tracker logic 110 may be configured to use the climate data to calculate driving efficiency point values for operators, as climate may have an impact on energy usage by vehicles. Factoring in climate information in the driving efficiency point value calculations may provide a more accurate and fair assessment of driving efficiency point values for operators in regions experiencing extreme climates. In an alternative embodiment to the GPS

126, the efficiency score tracker logic 110 may be configured to receive climate or location data directly input by the operator, e.g., via the I/O component 120 controls.

In an embodiment, the vehicle 101 may include a road side assistance service, such as OnStar™ which may be communicatively coupled to the communication system 104 in facilitating the communications described with respect to the efficiency score tracker services.

While the exemplary efficiency score tracker services are described herein with respect to a communication system 104, which is described as an onboard vehicle system, it will be understood that other implementations may be configured to realize the advantages of the invention. For example, a portion of the functionality performed by the communication system 104 may be implemented using a wireless communications device, e.g., a smart phone and corresponding logic 124, that is communicatively coupled in a wireless fashion to components of the communication system 104 via a short-range communications network (e.g., via BlueTooth™). In addition, the efficiency score tracker processes described herein may be implemented primarily through the logic 110 executing on the host system 102. However, it will be understood that at least a portion of the processes may be implemented via the logic 124 executing on the computer processor 122 of the communication system 104 of the vehicle 101.

In an embodiment, a vehicle owner or operator (referred to herein as "operator," "user," or "subscriber") may configure efficiency tracker preferences through a user interface provided by the efficiency score tracker logic 110 over networks 106 or via logic 124 and I/O components 120 (e.g., where the logic 124 is downloaded to the communication system 104 or via the user system 107, e.g., via a web site of the host system 102. The operator may identify himself to the communication system 104 or host system 102, e.g., using, e.g., key fob identification information provided by a key fob when engaged in the vehicle ignition system. Alternatively, the operator may identify himself through a user-selected personal identification number created by the operator and entered into the system. In yet a further embodiment, the operator may identify himself via a cell phone communication between the operator's cell phone and the communication system 104 (e.g., through a short-range communications antenna) and/or the host system 102 via the networks 106. The operator may be identified by the cell phone number assigned to the cell phone. The logic 124 accesses user preferences configured by the operator according to the identification made.

The logic 124 monitors the vehicle 101 operation over time and stores driving efficiency, repair/maintenance, and safety behavior statuses in the storage device 128. Alternatively, the driving efficiency and repair/maintenance information may be uploaded to the host system 102 and stored in the storage device 112. The driving efficiency information, safety behavior, and the repair/maintenance status information includes point values assigned by the efficiency score tracker logic 110 to the vehicle operator(s) over time.

In an embodiment, the operator may enter user preferences via the I/O components 120 (or other communications device, such as a smart phone that executes the logic 124 or via the user system 107). The user preferences may include an identification of other operators (e.g., members of a family or user's account) or vehicles with whom the user would like to collaborate with respect to the efficiency score tracking services. The user preferences may also include the ability for the user to select a global collaboration option in which the user engages in a friendly competition with other subscribers in the local region (e.g., city or town), in the state, around the country or world. In an embodiment, the user preferences include an option to activate or de-activate the services.

Figure 2A:
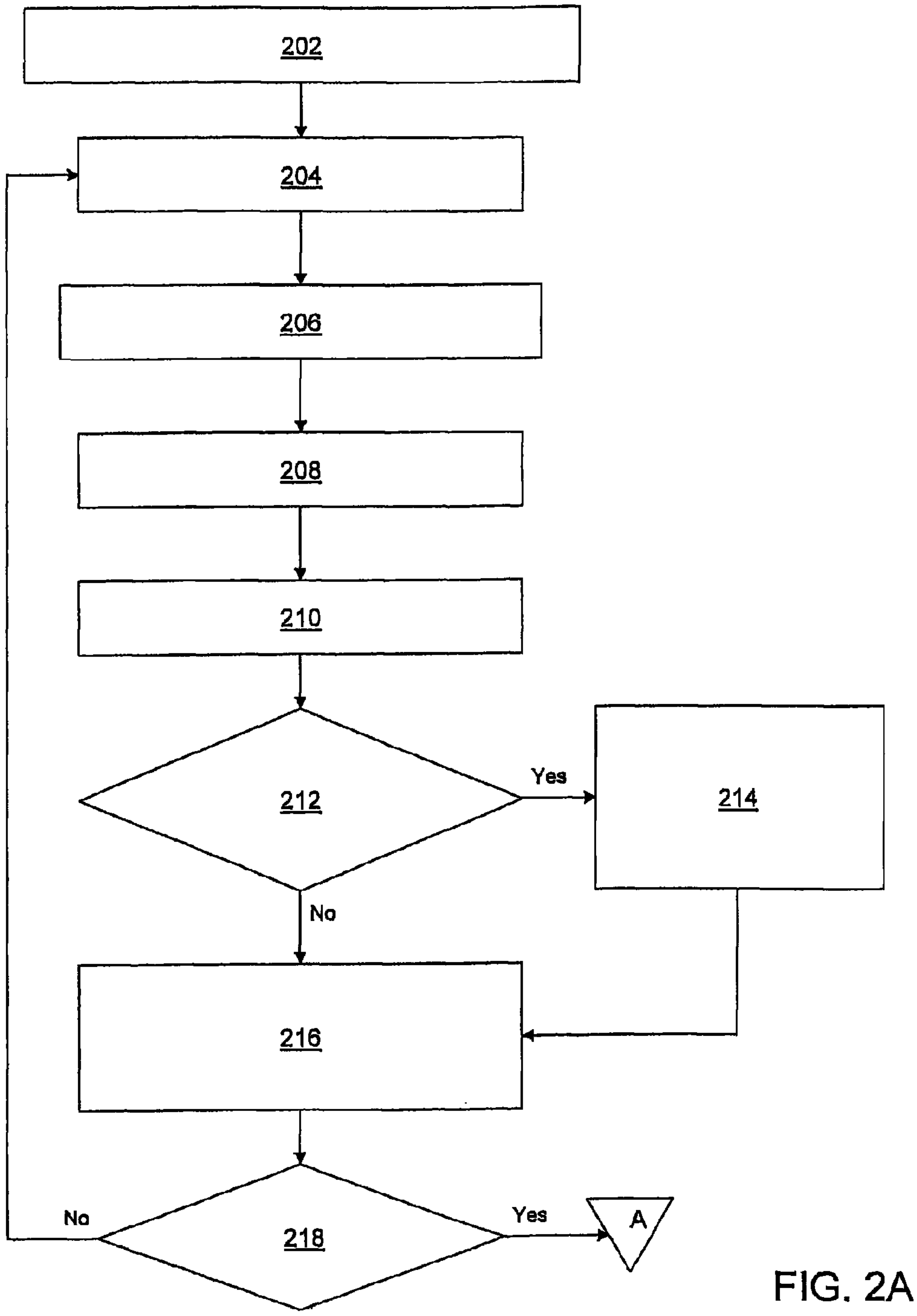
FIGS. 2A-2B are flow diagrams describing a process for implementing the efficiency score tracking services in accordance with an embodiment.
Figure 2B:
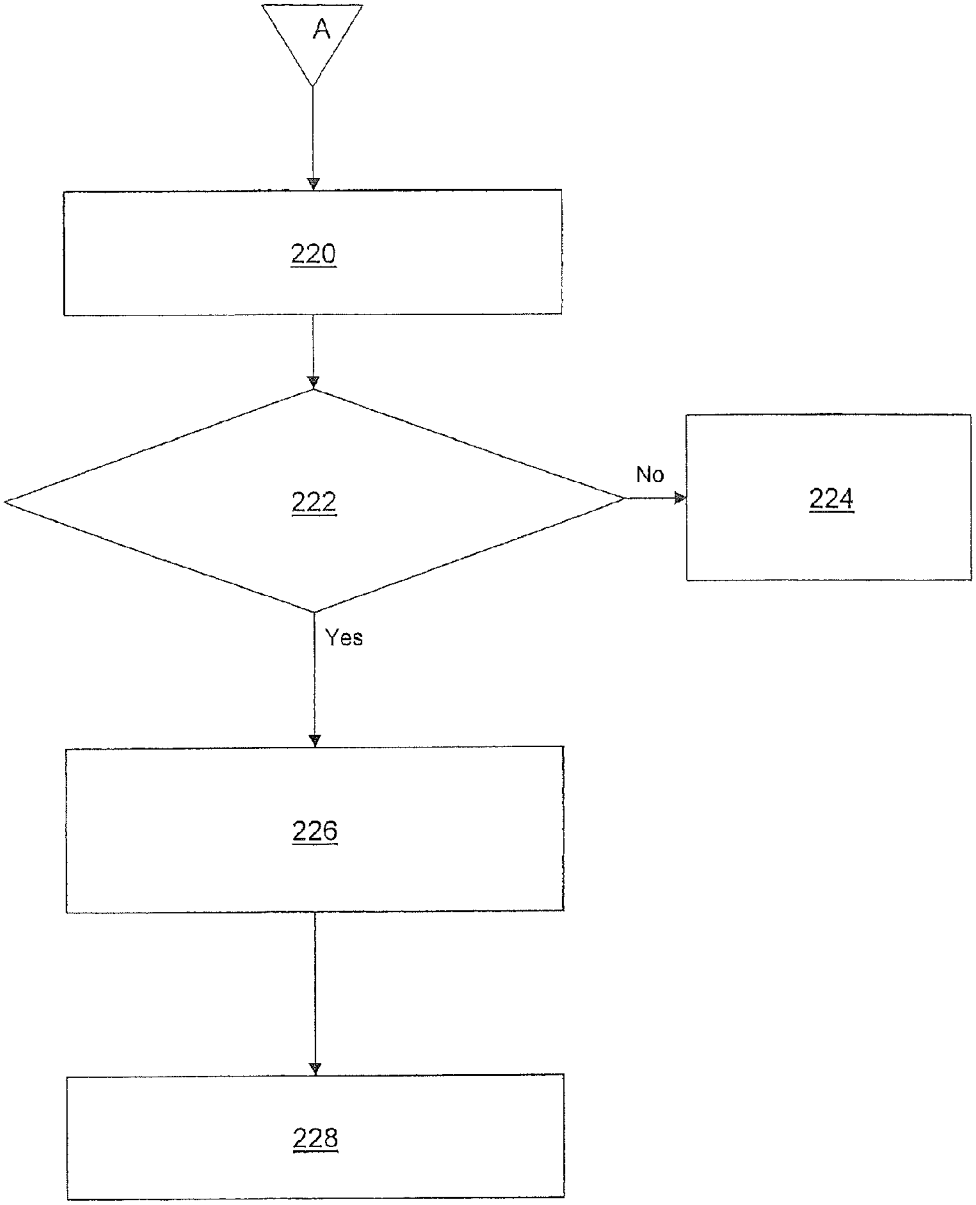

Once the user has entered the preferences, the efficiency score tracker services are ready to be implemented. Turning now to FIGS. 2A-2B, a process for implementing the efficiency score tracker services will now be described in an exemplary embodiment. The processes described in FIGS. 2A-2B assume that a user is a subscriber of the efficiency score tracker services and has physically entered a vehicle (e.g., vehicle 101) to initiate a driving event. A driving event may be defined by a road trip (e.g., origination to final destination), all driving activities conducted during the course of a 24-hour period, or via the ignition system (e.g., between powering on the vehicle and powering off the vehicle), to name a few. Further, the efficiency score tracker processes described in FIGS. 2A-2B are described as being implemented primarily through the logic 110 executing on the host system 102. However, it will be understood that at least a portion of the processes may be implemented via the logic 124 executing on the computer processor 122 of the communication system 104 of the vehicle 101.

The process begins at step 202 whereby the logic 110 identifies the operator/user of the vehicle 101. At step 204, the logic 110 determines the mileage accrued for a specified time period (e.g., a defined portion of the driving event). At step 206, the logic 110 determines the amount of energy consumed for the specified time period. This may be implemented by monitoring vehicle components, such as fuel gauge sensors and power sources, and determining variations in the fuel/power levels over the time period. In this manner, the processor 122 is part of, or communicatively coupled with, the vehicle's control system that monitors various vehicle components. At step 208, the logic 110 calculates a fuel efficiency rating for the specified time period. The fuel efficiency rating may be calculated as a function of the mileage accrual and the energy consumption over the time period. For example, if the mileage accrual for the time period is 25 miles and the amount of fuel consumed is 1 gallon, the logic determines a miles-per-gallon ratio (i.e., 25 mpg) and compares it with what is considered average for the particular vehicle make, model, and year.

At step 210, the logic 110 assigns a point value to the efficiency value. The point value assignment may be implemented using a variety of techniques. In one embodiment, the logic 110 may configure a chart of point values that are mapped to specific fuel efficiency values. Using the example above, the efficiency value is 25 mpg. Suppose the estimated average efficiency rating for the vehicle is 20 mpg. The logic 110 may access a pre-defined chart of point values that are mapped to efficiency values. In the above example, the operator has exceeded the average efficiency rating by 5 mpg. Since the efficiency value is greater than the average efficiency rating for the vehicle, the point value will reflect a positive increase in points assigned to the operator for the time period. Likewise, if the efficiency value is lower than the average efficiency rating, the logic 110 may deduct a proportionate number of points from the operator's overall points for the driving event. In an alternative embodiment, the logic 110 does not deduct points in this instance, but rather keeps the point value the same so that the operator does not continue to accumulate points for the time period.

At step 212, the logic 110 determines if any previous point values have been assigned (i.e., if this is the first time increment of the driving event, no previous point values have been allocated to the operator). If so, the logic 110 adds the point value for the current time period to all previous point values assigned to the operator for previous time periods with respect to the driving event at step 214. At step 216, the logic 110 displays the point value (if it is the first time period) or the accumulated point values assigned for the driving event to the operator, e.g., via the vehicle display (I/O components 120).

At step 218, the logic 110 determines if the driving event is finished. If not, the process returns to step 204 whereby the logic 110 continues to monitor mileage accrual for the next time period in the driving event. Otherwise, if the driving event is finished, the logic 110 displays the total accumulated points for all point values earned during the driving event at step 220.

At step 222, the logic 110 determines if the driving event is part of a collaborative activity. If not, the logic 110 stores the total point value earned in the storage device 112 at step 224. Otherwise, the logic 110 calculates a highest total point value for all operators participating in the collaborative activity at step 226, and displays a list of the highest scoring operators for the operator at step 228.

Figure 3:
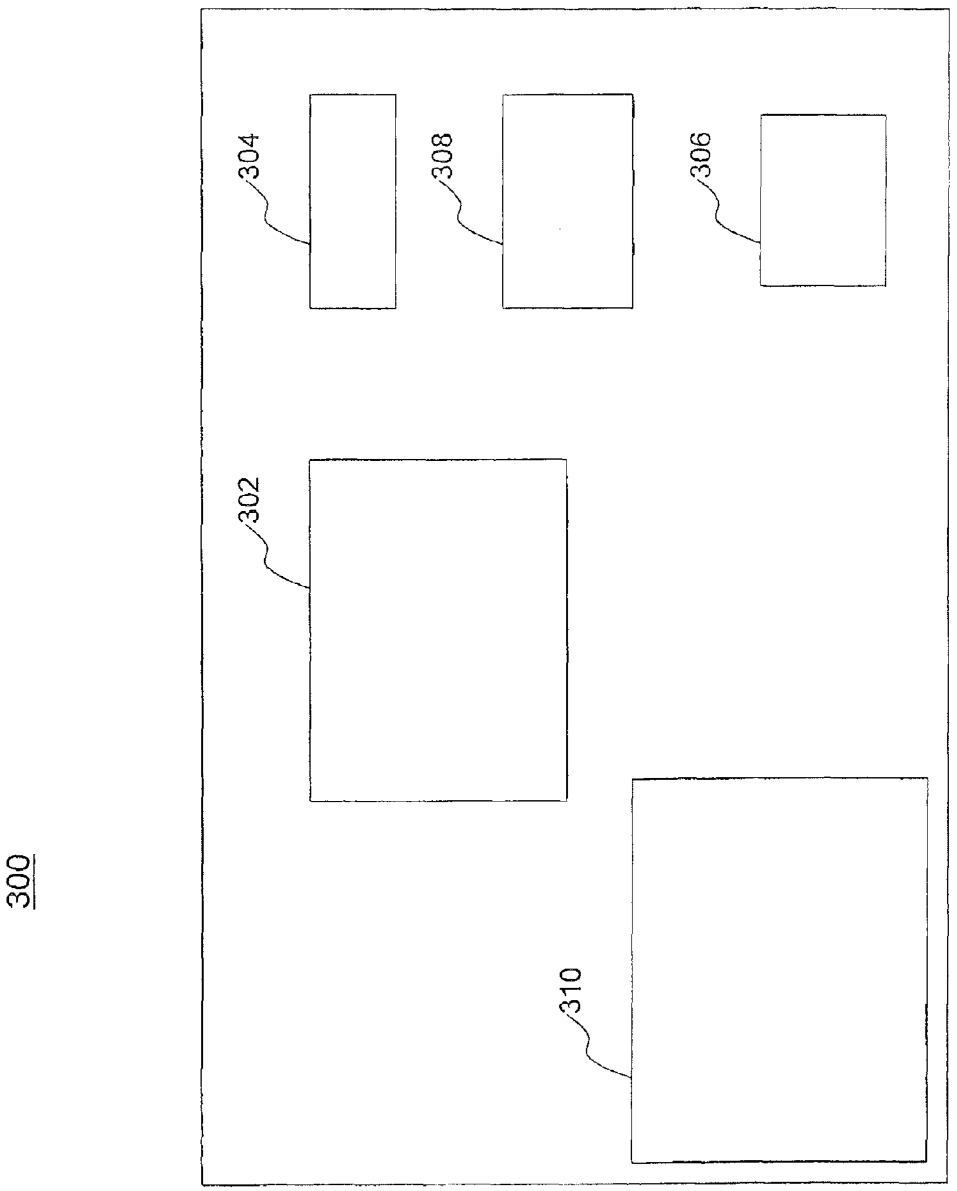
FIG. 3 is a user interface screen with sample efficiency score tracking data in accordance with an embodiment.

As shown in FIG. 3, a user interface screen 300 illustrates sample driving efficiency data for an operator. The user interface screen 300 may be displayed in the vehicle, e.g., on a display device of a dashboard or instrument panel of the vehicle. The user interface screen 300 displays information such as a current speed 302, gear engaged 304, and an odometer reading 306, which is monitored by the processor 122. In an embodiment, the user interface screen 300 also displays a total number of points accrued 308 for a series of driving events over a period of time, and a list of the top highest scorers 310. The list of scorers 310 may include the scorers' name, location, ranking, and points earned.

As indicated above, an operator may also be monitored for compliance with recommended or scheduled vehicle maintenance or repairs. If an operator complies with a vehicle maintenance schedule (e.g., oil changes, tire rotation, brake inspection, air filter replacement, recommended mileage service, recalls, etc.), points are added to a separate bank (i.e., a different bank than the driving efficiency points). For example, for every 100 miles the vehicle is driven past the 0% oil life mark, points are deducted from the operator's bank. One benefit of this feature is that it encourages operators to keep up on recommended vehicle maintenance, which can result in improved vehicle performance, extended life of the vehicle, reduction in repair costs, and may provide any new owner insight into the vehicle's maintenance history. Points are accrued and subtracted in a manner similar to that described above with respect to the driving efficiency processes of FIGS. 2A-2B. The points accrued may be used in competition with other vehicle operators as described above.

As indicated above, an operator may also be monitored for compliance with recommended safety activities, such as turn signal usage, speed limit compliance, refraining from tailgating, and lane change clearance, to name a few. If an operator complies with these safety recommendations, points are added to a separate bank (i.e., a different bank than the driving efficiency points and the vehicle maintenance points). For example, turn signal usage may be monitored by identifying a turn angle executed by the vehicle in conjunction with the vehicle's turn signal component. Tailgating and lane change clearance may be monitored using, e.g., front and rear object sensors, such as a laser range sensor that is communicatively coupled to the processor 122. Points are accrued and subtracted in a manner similar to that described above with respect to the driving efficiency processes of FIGS. 2A-2B. The points accrued may be used in competition with other vehicle operators as described above.

In an embodiment, the efficiency score tracker logic 110 may be configured to award prizes or incentives to high-ranking subscribers. For example, a subscriber with the highest points earned (for driving efficiency and/or vehicle maintenance and repair) may be awarded prizes, such as a free music download, a free month of satellite radio, a free month of OnStar™ service, a free oil change service, etc. In another embodiment, the efficiency score tracker services may be configured to work with motor vehicle insurers, whereby operators demonstrating continued high scores (e.g., exceeding a threshold number of points over a defined period of time, such as a twelve consecutive months) may be offered special discounts in insurance rates. A subscriber opts into this program and, if eligible, his/her insurer is contacted and a discount is applied similar to a safe driver discount.

In a further embodiment, the efficiency score tracker logic 110 may be configured to monitor and utilize data from a vehicle's active safety systems (e.g., sensors that track lane keeping, provide lane departure warnings, and collision prevention, to name a few). These systems typically have high thresholds in order to prevent overriding a driver's actions; however, the active safety systems may be monitored by the efficiency score tracker logic 110 to determine how close the operator is to these thresholds as a measure of safety performance.

Technical effects of the invention include providing incentives to vehicle operators to engage in activities that are known to reduce energy consumption, conserve the environment, and provide safety on the road by monitoring driving efficiency of operators in terms of energy usage and compliance with vehicle maintenance and repair schedules, calculating an efficiency score, and presenting this information to the operator, as well as providing high scoring information to the operator in a friendly competition.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A system for implementing efficiency score tracking for vehicle operations, comprising:

a computer processor; and logic executable by the computer processor, the logic configured to implement a method, the method comprising:

identifying an operator of a vehicle;

at each time increment for a duration of a driving event with respect to the vehicle:

determining mileage accrual and an amount of energy consumed, wherein a value representing the amount of energy consumed is calculated based on variations in climate, the climate determined, in part, from a global positioning system location acquired from the vehicle;

calculating an efficiency value as a function of the mileage accrual and the amount of energy consumed;

assigning a point value to the efficiency value;

adding the point value to previous point values, if any, assigned during the driving event; and displaying a sum of the point value and the previous point values, if any, to the operator in the vehicle, the sum reflecting a cumulative number of points assigned for a corresponding time increment and any previous time increments of the driving event; and presenting a total point value reflecting a sum of all of the point values assigned to the operator of the vehicle for all of the time increments associated with the driving event.

2. The system of claim 1, wherein the logic is further configured to implement:

calculating total point values for operators of a plurality of other vehicles with respect to corresponding driving events associated with the operators;

determining which of the operators including the operator of the vehicle has a highest total point value;

creating a list of a number of the operators having the highest total point value; and presenting the list to the operators of the plurality of vehicles and the operator of the vehicle.

3. The system of claim 2, wherein the logic is further configured to implement:

providing an award to an operator on the list having a highest total point value.

4. The system of claim 1, wherein the logic is further configured to implement:

storing the total point value in a storage device; and displaying a history of total point values assigned to the operator over time.

5. The system of claim 1, wherein the logic is further configured to implement:

monitoring a status of vehicle maintenance activities for the vehicle;

assigning a point value for executed vehicle maintenance activities;

detracting a point value for unexecuted vehicle maintenance activities;

calculating a total point value for the vehicle maintenance activities based on the executed vehicle maintenance activities and the unexecuted vehicle maintenance activities, the executed vehicle maintenance activities resulting in an increase in the total point value for the vehicle maintenance activities and the unexecuted vehicle maintenance activities resulting in a decrease in the total point value for the vehicle maintenance activities; and presenting the total point value for the vehicle maintenance activities to the operator of the vehicle.

6. The system of claim 5, wherein the vehicle maintenance activities include at least one of:

oil change;

tire rotation;

brake inspection;

air filter replacement;

recommended mileage service; and vehicle recall.

7. The system of claim 5, wherein the logic is further configured to implement:

calculating total point values for operators of a plurality of other vehicles with respect to the vehicle maintenance activities;

determining which of the operators including the operator of the vehicle has a highest total point value for the vehicle maintenance activities;

creating a list of a number of the operators having the highest total point value for the vehicle maintenance activities; and presenting the list to the operators of the plurality of vehicles and the operator of the vehicle.

8. A method for implementing efficiency score tracking for vehicle operations, comprising:

identifying, via computer processor, an operator of a vehicle;

at each time increment for a duration of a driving event with respect to the vehicle:

determining, via the computer processor, mileage accrual and an amount of energy consumed, wherein a value representing the amount of energy consumed is calculated based on variations in climate, the climate determined, in part, from a global positioning system location acquired from the vehicle;

calculating, via the computer processor, an efficiency value as a function of the mileage accrual and the amount of energy consumed;

assigning a point value to the efficiency value;

adding the point value to previous point values, if any, assigned during the driving event; and displaying a sum of the point value and the previous point values, if any, to the operator in the vehicle, the sum reflecting a cumulative number of points assigned for a corresponding time increment and any previous time increments of the driving event; and presenting a total point value reflecting a sum of all of the point values assigned to the operator of the vehicle for all of the time increments associated with the driving event.

9. The method of claim 8, further comprising:

calculating total point values for operators of a plurality of other vehicles with respect to corresponding driving events associated with the operators;

determining which of the operators including the operator of the vehicle has a highest total point value;

creating a list of a number of the operators having the highest total point value; and presenting the list to the operators of the plurality of vehicles and the operator of the vehicle.

10. The method of claim 9, further comprising:

providing an award to an operator on the list having a highest total point value.

11. The method of claim 8, further comprising:

storing the total point value in a storage device; and displaying a history of total point values assigned to the operator over time.

12. The method of claim 8, further comprising:

monitoring a status of vehicle maintenance activities for the vehicle;

assigning a point value for executed vehicle maintenance activities;

detracting a point value for unexecuted vehicle maintenance activities;

calculating a total point value for the vehicle maintenance activities based on the executed vehicle maintenance activities and the unexecuted vehicle maintenance activities, the executed vehicle maintenance activities resulting in an increase in the total point value for the vehicle maintenance activities and the unexecuted vehicle maintenance activities resulting in a decrease in the total point value for the vehicle maintenance activities; and presenting the total point value for the vehicle maintenance activities to the operator of the vehicle.

13. The method of claim 12, wherein the vehicle maintenance activities include at least one of:

oil change;

tire rotation;

brake inspection;

air filter replacement;

recommended mileage service; and vehicle recall.

14. The method of claim 12, further comprising:

calculating total point values for operators of a plurality of other vehicles with respect to the vehicle maintenance activities;

determining which of the operators including the operator of the vehicle has a highest total point value for the vehicle maintenance activities;

creating a list of a number of the operators having the highest total point value for the vehicle maintenance activities; and presenting the list to the operators of the plurality of vehicles and the operator of the vehicle.

15. A computer program product for implementing efficiency score tracking for vehicle operations, the computer program product comprising a non-transitory storage medium embodied with computer-readable program instructions, which when executed by a computer, cause the computer to implement a method, the method comprising:

identifying an operator of a vehicle;

at each time increment for a duration of a driving event with respect to the vehicle:

determining mileage accrual and an amount of energy consumed, wherein a value representing the amount of energy consumed is calculated based on variations in climate, the climate determined, in part, from a global positioning system location acquired from the vehicle;

calculating an efficiency value as a function of the mileage accrual and the amount of energy consumed;

assigning a point value to the efficiency value;

adding the point value to previous point values, if any, assigned during the driving event; and displaying a sum of the point value and the previous point values, if any, to the operator in the vehicle, the sum reflecting a cumulative number of points assigned for a corresponding time increment and any previous time increments of the driving event; and presenting a total point value reflecting a sum of all of the point values assigned to the operator of the vehicle for all of the time increments associated with the driving event.

16. The computer program product of claim 15, wherein the program instructions further implement:

calculating total point values for operators of a plurality of other vehicles with respect to corresponding driving events associated with the operators;

determining which of the operators including the operator of the vehicle has a highest total point value;

creating a list of a number of the operators having the highest total point value; and presenting the list to the operators of the plurality of vehicles and the operator of the vehicle.

17. The computer program product of claim 16, wherein the program instructions further implement:

providing an award to an operator on the list having a highest total point value.

18. The computer program product of claim 15, wherein the program instructions further implement:

storing the total point value in a storage device; and displaying a history of total point values assigned to the operator over time.

19. The computer program product of claim 15, wherein the program instructions further implement:

monitoring a status of vehicle maintenance activities for the vehicle;

assigning a point value for executed vehicle maintenance activities;

detracting a point value for unexecuted vehicle maintenance activities;

calculating a total point value for the vehicle maintenance activities based on the executed vehicle maintenance activities and the unexecuted vehicle maintenance activities, the executed vehicle maintenance activities resulting in an increase in the total point value for the vehicle maintenance activities and the unexecuted vehicle maintenance activities resulting in a decrease in the total point value for the vehicle maintenance activities; and presenting the total point value for the vehicle maintenance activities to the operator of the vehicle.

20. The computer program product of claim 19, wherein the vehicle maintenance activities include at least one of:

oil change;

tire rotation;

brake inspection;

air filter replacement;

recommended mileage service; and vehicle recall.

* * * * *